(No Model.)
A. STARK.
HARVESTER REEL.
No. 339,229. Patented Apr. 6, 1886.
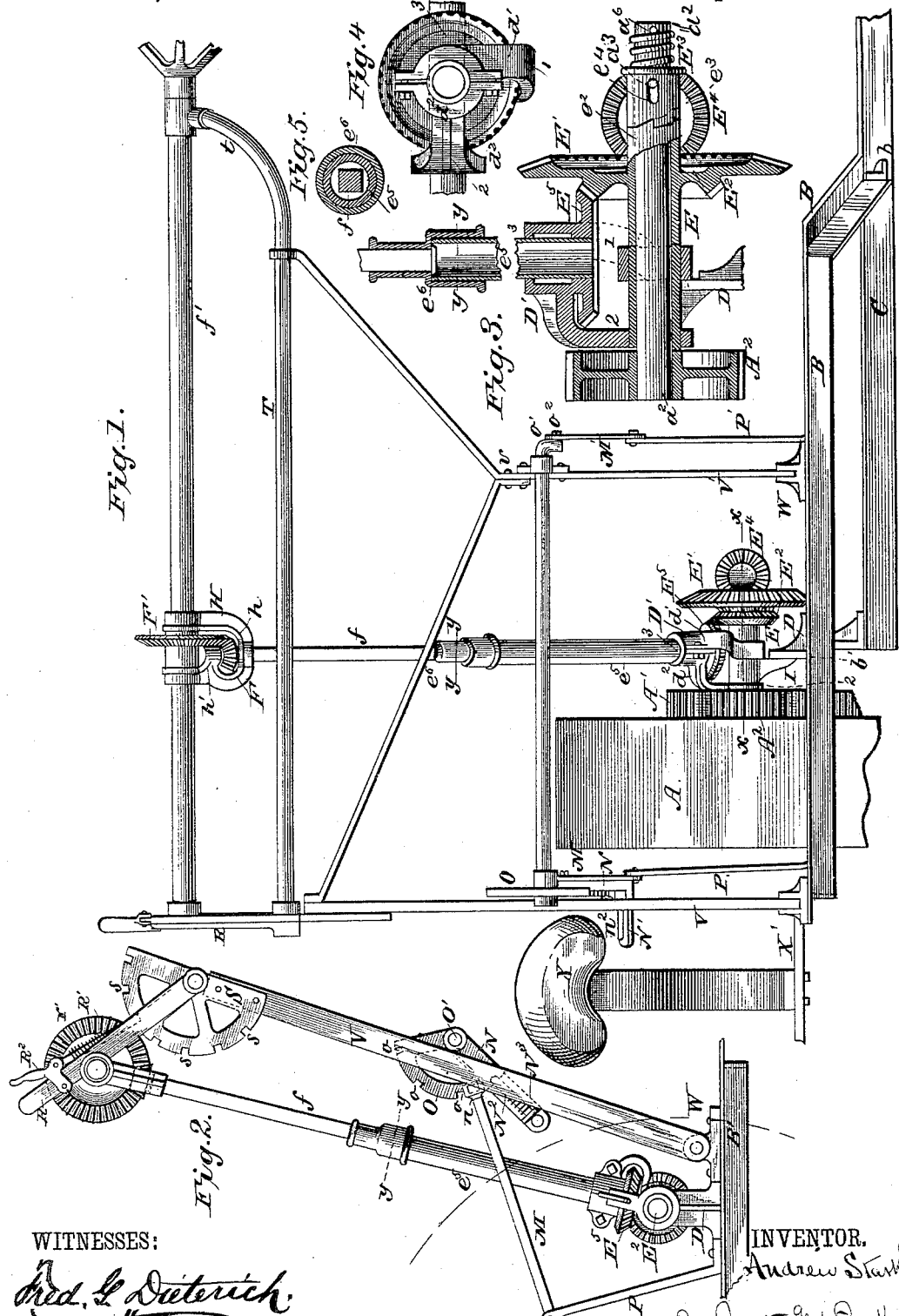
WITNESSES:
INVENTOR.
Andrew Stark
By Burton and Parker
ATTORNEYS.

United States Patent Office.

ANDREW STARK, OF CHICAGO, ILLINOIS.

HARVESTER-REEL.

SPECIFICATION forming part of Letters Patent No. 339,229, dated April 6, 1886.

Application filed May 5, 1884. Serial No. 130,479. (No model.)

*To all whom it may concern:*

Be it known that I, ANDREW STARK, a citizen of the United States, and residing at Chicago, in the county of Cook and State of Illinois, have invented certain new and useful Improvements in Harvester-Reels, which are fully set forth in the annexed specification.

I aim by this invention to drive the reel of a harvesting-machine without the use of a chain or belt, to give it its motion by positive gear-connection with the main driving-shaft, and with but one shaft and bevel-gear thereon, constituting the entire train between the driving-pinion on the main shaft and the bevel-gear on the reel-shaft.

I aim also to provide means for adjusting the reel to and from the sickle without the means of sliding bearings for the reel-supports.

I aim also to transmit power to the reel-driving mechanism from a point in the main driving-train subsequent to the location of the clutch mechanism, whereby the cutting mechanism is thrown in and out of gear, so that the reel may rest when the sickle rests, and may be actuated only when the sickle is in action.

My invention consists, further, in details of construction illustrated in the drawings, and hereinafter described, and set forth in the claims.

Figure 1 is a front elevation of the reel-shaft, its support upon the main frame and driving-connections with the main driving-shaft and main wheel. Fig. 2 is an outer end elevation of the same, the main driving-wheel and gear-pinion being omitted in order to show the other parts more clearly. Fig. 3 is a vertical section through the line $x\,x$ in Fig. 1, showing in an enlarged detail the bearings and connections of the main driving-shaft and the reel driving and adjusting mechanism. Fig. 4 is a plan of the yoke on the main driving-shaft, in which bears the lower end of the reel-driving shaft, and showing therein the miter-gear on said shaft. Fig. 5 is a transverse section through the line $y\,y$ in Figs. 1, 2, and 3.

A is the main driving-wheel; A', the driving gear-wheel thereon.

A² is the main driving-pinion meshing with the driving gear-wheel A'.

$a^2$ is the main driving-shaft to which the main driving-pinion A² is fixed.

B is a portion of the main frame of the machine.

C is a portion of the finger-bar, forming the front sill of the platform, intersecting and secured to the frame at $b$, and rigidly secured to some part of it at $b'$.

To the main frame B are secured brackets W, to which are pivoted, so as to swing in vertical planes parallel with the line of travel, two lever-arms, V and V', the former on the stubble side and the latter on the grain side of the driving-wheel. At V the lever V' is bent diagonally grainward, and at the same point there is bolted to it the brace V², extending diagonally stubbleward, and bolted to the lever V near its upper end. The lever V', at its upper end, is provided with a bearing for the rock-shaft T.

To the upper end of the lever V is secured the notched segment S, at the center of which, in line with the lever V, I provide another bearing for the rock-shaft T. To the end of the rock-shaft outside the segment I secure the lever-arm R, having for the purpose of securing it in any desired position about the segment S the bolt R', adapted to engage the notches $s$, connected by the bell-crank lever R² to the lever R, and provided with a spring, $r'$, to throw it into engagement with the notches.

In the lever R, at a suitable distance from the rock-shaft T, I journal one end of the reel-shaft, the other end being journaled in the crank-arm $t$ of the rock-shaft T.

D is a casting secured to the main frame, affording bearings for the sleeve E, cast as an extension of the bevel gear-wheels E' and E², within which sleeve the main driving-shaft $a^2$ obtains bearing.

E³ is a collar on the shaft $a^2$, provided with a clutch, $e^3$, reciprocal to the clutch $e^2$, which terminates the sleeve E at its inner end. $a^3$ is a pin rooted in the shaft $a^2$ and playing in a slot, $e^4$, in the collar E³. $a^5$ is a spring coiled on the end of the shaft $a^2$, between the end of the collar E³ and the pin $a^6$, rooted in the shaft $a^2$. These parts, which constitute the clutch mechanism by means of which the machine is thrown in and out of gear, together with the further devices for manipulating the same, are fully explained in an application by me August 4, 1883, Serial No. 102,762, and now pending in the Patent Office, and I will not further explain them here. The bevel-gear E' actuates the bevel-gear $E^4$, and thereby drives the cutting mechanisms. The bevel-gear $E^2$ is cast integral with the gear E' and with the sleeve E.

D' is a yoke made in two parts, $d'$ and $d^2$, arranged to be bolted together after the bevel-gears, which work within it, as hereinafter explained, are put in position. This yoke has two branches, 1 and 2, in which the sleeve E is journaled, so that it serves as the immediate support for the yoke and the parts bearing therein.

In the hub 3 of the yoke D' is journaled the shaft $e^5$, at right angles to the shaft $a^2$, and to the end of said shaft within the yoke D' is pinned fast the miter-gear $E^5$, meshing with and driven by the bevel-gear $E^2$. This shaft $e^5$ I make tubular, and provide the cap $E^6$, fastened securely upon its upper end, and having a square opening, $e^6$, as the continuation of the cylindrical opening of the tubular shaft $e^5$.

$f$ is a square shaft of size to fit closely in but slide through the opening $e^6$. At its upper end it is made round and journaled in the bow $h$ of the yoke H, and also in the lug $h'$, projected inwardly from the side of the bow. Between the lug and the bow there is pinned fast on the shaft $f$ the bevel-pinion F. At right angles to the shaft $f$ the reel-shaft $f'$ passes through bearings provided for it in the arms of the yoke H, and between those bearings, pinned fast on the reel-shaft, is the bevel-gear F', meshing with and driven by the bevel-pinion F. The pinions F and F' also serve as collars to secure the yoke H in proper place upon the shaft $f$ and the reel-shaft $f'$, respectively, and the said gears, having their shaft, bearings all in the one rigid casting H, are retained securely in mesh.

To the end bar, B', of the frame B, on the stubble side of the driving-wheel, I secure an upright bracket, P, and on the grain side of the wheel, inside of the bracket W, a similar and equal upright bracket, P'. To the side of the lever V, in a plane parallel to the line of travel, I secure the notched segment O, and at its center I provide the bearing for the shaft O', which extends horizontally across to a similar bearing provided on the lever V'. To this shaft, close against the segment O, I secure the lever N. From the lug $n$ thereon I extend the link M to the upper end of the bracket P, pivoting it at both connections. The lever N, pivoted on the side of the lever V on the side toward the driving-wheel, has the arm N', bent at right angles with its main direction, so as to extend beyond the lever V toward the stubble a sufficient distance to make it serve as a handle by which the lever may be operated. Alongside of the lever N, and provided with suitable bearings thereon, I provide the the bolt $N^2$, adapted to engage the notches $o$ of the segment O. This bolt is also bent in a right angle, so as to have an arm, $n^2$, lying alongside of and within the arm N' of the lever N, so as to be grasped by the hand, together with the handle N'.

Between the ears $n'$ on the lever N, which serve as bearings for the bolt $N^2$, I provide a coiled spring, $N^3$, around the bolt, tending to force it into engagement with the notches $o$ of the segment O. At the inner end of the shaft O' it is bent into a crank-arm, $o'$, of which the wrist $o^2$ is in line with the lug $n$ parallel to the shaft O', and from said crank-arm to the upper end of the bracket P', I extend a link, M', similar and equal to the link M and similarly connected. The operation of this structure is that the bevel-gear $E^5$ is driven by its engagement with the bevel-gear $E^2$ whenever the sleeve E is in engagement by means of the clutching device with the main shaft $a^2$—that is to say, whenever the cutting mechanism driven by the gear $E^4$ is in action, so that the reel rests when the sickle rests, and not otherwise.

The adjustments of the reel are as follows: Its adjustment to and from the sickle is effected by rocking the entire frame which supports it, consisting of the levers V and V' and the rock-shaft T, journaled at the upper end of said levers, upon the axis of that frame, the line of the pivots of said levers V and V' to their respective brackets W. This rocking is effected by means of the lever N and its connections, the link M, crank-shaft O', the link M' with the brackets P and P', the swinging of said lever from the segment O carrying the link M and its corresponding point at the other end, the wrist $o^2$ to or from the pivots of the links M and M' to the brackets P and P', the bolt $N^2$ engaging in the notches $o$ of the segment and serving to fix it at any desired position. As the reel is thus rocked to and fro, the reel-driving shaft, made up of the tubular shaft $e^5$ and the square shaft $f$, telescoping therein, carries with it the yoke D', rocking upon the sleeve E about the axis of the gear $E^2$, with which, therefore, the gear $E^5$ is thus kept constantly in mesh in all positions. The axis about which the frame rocks being different from that about which the driving-shaft rocks, this rocking will cause the shaft $f$ to telescope within the tubular shaft $e^5$ as the reel-shaft approaches the vertical position, and to withdraw as it is inclined forward or backward. The arc through which the rock-shaft T is moved, however, being but a very few degrees either side of the vertical line of the rocking axis of the frame, the adjustment thereby effected is practically horizontal. To effect vertical adjustment, the reel-shaft is designed to be rocked about the axis of the rock-shaft T by means of the lever R, swinging over the segment S, and secured at any desired point by the engagement of the bolt R' with the notches $s$, the shaft $f$, as the reel is raised and lowered, thus telescoping with the tubular shaft $e^5$. In this adjustment the yoke H, which affords the upper bearing for the driving-shaft $f$, is swung about the axis of the reel-shaft. The pinion F on the upper end of the shaft being within the yoke is therefore retained in mesh with and in all positions continues to drive the bevel-gear F' and thereby the reel-shaft.

The seat X is sustained upon the seat frame X', which is secured adjustably or rigidly to the stubble end bar of the main frame B of the machine.

The described structure and position of the reel-sustaining frame and of the levers for actuating it are such as to bring the handles of both said levers on the stubble side of the wheel, and so within easy reach of the driver seated on that side of the wheel.

I claim—

1. The reel-sustaining frame and the reel-shaft journaled therein, and means for adjusting the position of said reel-frame and reel relatively to the main frame of the machine, in combination with a reel-driving shaft at right angles to the reel-shaft, a bearing-piece for the same vibrating about the axis of the main driving-shaft, a yoke having bearings at right angles to each other for the reel-shaft and the reel-driving shaft, whereby the said shafts are retained in the same plane, bevel gear-wheels on the main driving-shaft, reel-driving shaft, and reel-shaft, respectively, by which power is transmitted directly from the main driving-shaft to the reel-driving shaft and thence directly to the reel-shaft, and means for varying the distance between the carrying and the carried gear on said reel-driving shaft automatically as the reel-frame is adjusted to different positions, substantially as set forth.

2. A compound reel-sustaining frame, a reel-shaft journaled in the outer or upper member thereof, means for adjusting the position of the entire frame relatively to the main frame, and means for adjusting the position of the outer member of said frame relatively to the lower or inner member, in combination with a reel-driving shaft at right angles to the reel-shaft, a bearing-piece for the same vibrating about the axis of the main driving-shaft, a yoke having bearings at right angles with each other for the reel-shaft and the reel-driving shaft, whereby the said shafts are retained in the same plane, the bevel gear-wheels on the main driving-shaft, reel-driving shaft, and reel-shaft, respectively, by which power is transmitted directly from the main driving shaft to the reel-driving shaft and thence directly to the reel-shaft, and means for varying the distance between the driving and driven gear on the reel-driving shaft automatically as the reel-frame is adjusted to different positions, substantially as set forth.

3. A vibrating reel-sustaining frame capable of being made rigid throughout, and pivoted at its lower extremity to the main frame, or some fixed adjunct thereof, the reel-shaft journaled in the outer portion of said frame, means for rocking said frame over its pivot on the main frame, and means for securing it adjusted in any desired position, in combination with a reel-driving shaft at right angles to the reel-shaft, a bearing-piece for said shaft vibrating about the axis of the main driving-shaft, a yoke having bearings at right angles to each other for the reel-shaft and the reel-driving shaft, whereby said shafts are retained in the same plane, the bevel-gears by which power is transmitted from the main driving-shaft to the reel-driving shaft and thence to the reel-shaft, and means for varying the distance between the carrying and carried gear on said reel-driving shaft automatically as the reel-frame is adjusted to different positions, substantially as set forth.

4. In a harvesting-machine, a vibrating frame pivoted at one extremity to the main frame of the machine, or some fixed adjunct thereof, means for vibrating such frame over its pivotal support on the main frame, means for securing it adjusted in any desired position, a secondary reel-sustaining frame sustained upon and adjustable in relation to said vibrating frame, means for adjusting the position of said secondary frame relatively to said vibrating frame and for securing it adjusted in any desired position, and the reel-shaft journaled in said secondary frame, in combination with a reel-driving shaft at right angles to the reel-shaft, a bearing-piece for the same vibrating about the axis of the main driving-shaft, a yoke having bearings at right angles with each other for the reel-shaft and the reel-driving shaft, whereby the said shafts are retained in the same plane, the bevel-gears by which power is transmitted from the main driving-shaft to the reel-driving shaft and thence to the reel shaft, and means for varying the distance between the driving and the driven gears on the reel-driving shaft automatically as the reel-frame is adjusted to different positions, substantially as set forth.

5. In a harvesting-machine, a vibrating frame pivoted at one extremity to the main frame of the machine, or some fixed adjunct thereof, means for vibrating such frame over its pivotal support on the main frame, and means for securing it adjusted in any desired position, a secondary vibrating reel-sustaining frame pivoted to the outer portion of said primary vibrating frame, means for vibrating it about its said pivotal support, and means for securing it adjusted in any desired position in relation to said primary frame, and the reel-shaft journaled in the outer portion of said secondary frame, in combination with a reel-driving shaft at right angles to the reel-shaft, a bearing-piece for the same vibrating about the axis of the main driving-shaft, a yoke having bearings at right angles with each other for the reel-shaft and the reel-driving shaft, whereby said shafts are retained in the same plane, the bevel-gears whereby power is transmitted from the main driving-shaft to the reel-driving shaft and thence to the reel-shaft, and means for varying the distance between the driving and the driven gears on the reel-driving shaft, substantially as set forth.

6. In a grain-harvester, the reel-sustaining frame, the reel-shaft journaled therein, means for adjusting the position of said reel-frame and reel relatively to the main frame of the machine, a telescoping reel-driving shaft, a yoke having bearings at right angles to each other for the reel-shaft and the reel-driving shaft, whereby said shafts are retained in the same plane, a bearing-piece for said reel-driving shaft vibrating about the axis of the main driving-shaft, and the bevel gear-wheels on the main driving-shaft, reel-driving shaft, and reel-shaft, respectively, whereby power is transmitted directly from the main driving-shaft to the reel-driving shaft and thence directly to the reel-shaft, all combined and operating substantially as set forth.

7. In a grain-harvester, the reel-sustaining frame, the reel-shaft journaled therein, and means for adjusting the position of said reel and reel-frame relatively to the main frame of the machine, in combination with a yoke or frame pivoted upon and rocking about the main driving-shaft, the reel-driving shaft at right angles to the reel-shaft, a yoke or frame swinging upon said reel-shaft and swiveled upon the upper end of the reel-driving shaft, the bevel gear-wheels on the main driving-shaft, reel-driving shaft, and reel-shaft, respectively, by which power is transmitted directly from the main driving-shaft to the reel-driving shaft and thence directly to the reel-shaft, and means for varying the distance between the driving and the driven gear-wheels on the reel-driving shaft, substantially as set forth.

8. In a grain-harvester, the reel-sustaining frame, the reel journaled therein, and means for adjusting the position of the reel and reel-frame relatively to the main frame of the machine, in combination with a telescoping reel-driving shaft at right angles to the reel-shaft, a yoke or frame swinging upon the reel-shaft and swiveled upon the upper end of the reel-driving shaft, a yoke or frame pivoted upon and rocking about the main driving-shaft and having a bearing for the reel-driving shaft, and the bevel gear-wheels on the main driving-shaft, reel-driving shaft, and reel-shaft, respectively, by which power is transmitted directly from the main driving-shaft to the reel-driving shaft and thence directly to the reel-shaft, substantially as set forth.

9. In a grain-harvester, the reel-driving train, a wheel, from which the motion of such train is derived, revolving about the axis of the main driving-shaft, the clutch mechanism, whereby the cutting mechanism is thrown in and out of gear, located in the main driving-train preceding the wheel which imparts motion to the reel-driving train, all combined and operating as and for the purpose set forth.

10. In a grain-harvester, in combination with the reel-shaft, the reel-driving shaft, and the driven and driving gears on them, respectively, the yoke H, having the interior lug, $h'$, substantially as and for the purpose set forth.

11. In a grain-harvester, in combination with the reel-shaft, the reel-driving shaft, and the driven and driving gears on them, respectively, the yoke H, having its arms embracing the gear on the reel-shaft, and having the lug $h'$, located as shown, with reference to the bow of the yoke, whereby the gear is embraced between said lug and bow, substantially as and for the purpose set forth.

12. In a grain-harvester, in combination with a rocking reel-frame, the shaft $O'$, journaled therein, and having the cranks N and $D'$, the links M and $M'$, connecting said cranks, respectively, to fixed pivots on the main frame, or some fixed adjunct thereof, in line parallel to the shaft $O'$, means for swinging said cranks and turning said shaft about the axis of the shaft, and means for securing them in any desired position, substantially as and for the purpose set forth.

13. In combination with the main driving-shaft, the reel-driving shaft, the intermeshing gears thereon, and the yoke $D'$, made as described, in two pieces, $d'$ and $d^2$, having respectively the branches 1 and 2, each with a bearing for the driving-shaft, and arranged to form their junction in a plane which longitudinally bisects the reel-driving shaft, substantially as and for the purpose set forth.

In testimony whereof I have hereunto set my hand, in the presence of two witnesses, at Chicago, Illinois, this 8th day of April, 1884.

ANDREW STARK.

Attest:
CHAS. S. BURTON,
H. KEHRES.